(12) United States Patent
Archer, Jr.

(10) Patent No.: US 7,163,584 B1
(45) Date of Patent: Jan. 16, 2007

(54) APPARATUS FOR APPLYING LIQUID LINER TO ROCKET TUBE

(75) Inventor: Harry L. Archer, Jr., Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 335 days.

(21) Appl. No.: 10/927,647

(22) Filed: Aug. 25, 2004

(51) Int. Cl.
*B05C 11/10* (2006.01)

(52) U.S. Cl. .................. 118/712; 118/306; 118/317; 118/318

(58) Field of Classification Search ............ 118/665, 118/712, 622, 305, 306, 318, 317; 156/356
See application file for complete search history.

(56) References Cited

U.S. PATENT DOCUMENTS

| | | | |
|---|---|---|---|
| 3,965,676 A | 6/1976 | Schaffling ............... 60/255 |
| 4,185,557 A | 1/1980 | Gerrish, Jr. ............. 102/103 |
| 4,803,019 A | 2/1989 | Graham et al. ........... 264/3.1 |
| 4,821,511 A | 4/1989 | Felix et al. .............. 60/255 |
| 4,959,110 A * | 9/1990 | Russell ................. 156/187 |
| 5,280,706 A | 1/1994 | Yorgason ................. 60/255 |
| 5,767,221 A | 6/1998 | Poulter et al. ............ 528/51 |
| 6,790,284 B1 * | 9/2004 | Suzuki ................... 118/693 |
| 6,814,810 B1 * | 11/2004 | Prentice et al. ........... 118/677 |

FOREIGN PATENT DOCUMENTS

JP      4-363163      * 12/1992

* cited by examiner

*Primary Examiner*—George Koch
(74) *Attorney, Agent, or Firm*—Fredric J. Zimmerman

(57) ABSTRACT

An apparatus for applying liquid liner to the interior of a rocket motor tube includes a horizontal surface; a rail mounted on the horizontal surface; a carriage that is movable along the rail; cartridge saddles and a bearing block mounted on the carriage; a cartridge gun disposed in the cartridge saddles, the cartridge gun including an extended tip that is longer that the rocket motor tube to be lined; a power supply connected to the cartridge gun; a rotary driven linear actuator mounted on the bearing block; a shaft drive mounted on the bearing block in operative association with the rotary driven linear actuator and in contact with a trigger of the cartridge gun; a weighing scale disposed on the horizontal surface; and a V-block disposed on the weighing scale, the V-block for holding the mask mounted rocket motor tube in axial alignment with the extended tip of the cartridge gun.

9 Claims, 4 Drawing Sheets

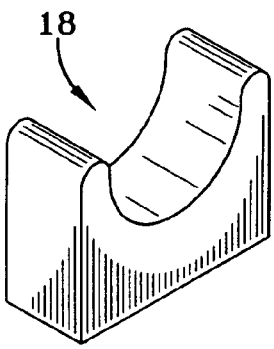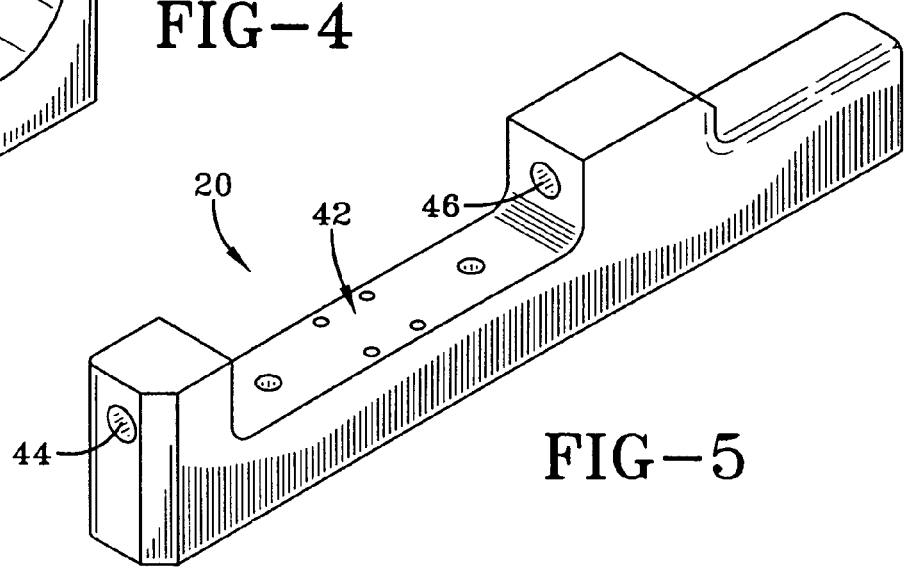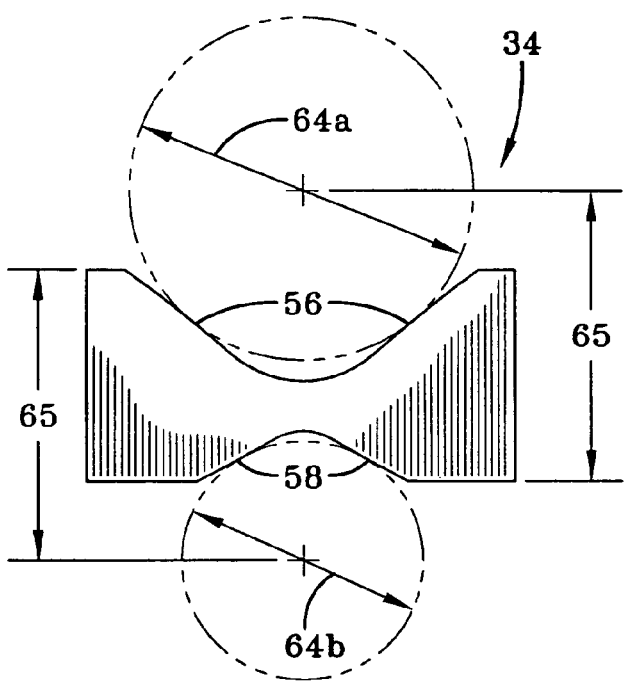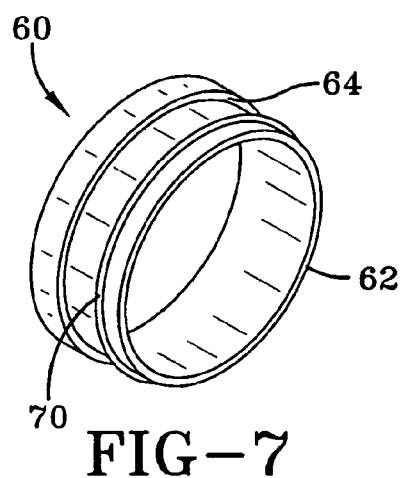

APPARATUS FOR APPLYING LIQUID LINER TO ROCKET TUBE

STATEMENT OF GOVERNMENT INTEREST

The invention described herein may be manufactured and used by or for the Government of the United States of America for government purposes without the payment of any royalties thereof.

BACKGROUND OF THE INVENTION

The invention relates in general to devices for dispensing liquid liner on the interior of rocket tubes and in particular to a device for dispensing a precise weight of liquid liner lengthwise into a rocket tube for subsequent dispersal. After the liner is dispensed, another apparatus, such as a brush, distributes the liner dispensed in the rocket tube.

Rocket motor tubes are lined with a fire retardant liner to prevent the propellant from burning through the tube wall. The liner is very viscous and must be metered in a precise amount. Too little liner results in inadequate motor protection during firing. Too much liner reduces the available volume for propellant thereby lowering the overall impulse of the rocket motor. One method of metering liner into the motor tube is with a pressure pot. The pressure pot is pressurized with air that forces liner out through a valve and a long tube that spans the length of the rocket tube. The valve is opened and a bead of liner is dispensed lengthwise in the rocket tube as the tube is moved axially along the discharge. After lining, the rocket tube's original weight is compared to the weight of the tube with the liner to determine the amount of liner dispensed in the tube. Liner is then added or subtracted to reach the desired liner weight. The rocket tubes are, for example, about three feet long and two to three inches in diameter. The dispensed liner is spread using a long flat blade. A spatula on a stick is used to add or remove liner.

Using the above-described method, it is difficult to dispense a precise amount of liner in the tube the first time. Moreover, as the liner gets thicker with time the rate at which the liner is dispensed varies. In addition, the method is very labor intensive. It is difficult to know how much liner is left in the pressure pot during the process. If the pressure pot runs empty, the liner will spit out thereby further complicating cleanup. After lining, cleanup of the pressure pot, flat blade spreader bar and surrounding area requires toluene to remove the liner from contaminated surfaces.

The present invention overcomes the problems of the prior art by providing an apparatus that can accurately meter the amount of liner dispensed in the tube. Using the invention, a user can remotely deposit a fixed weight of viscous liner material in a horizontal rocket tube using one hand to control both the amount of flow and the translation of the dispensing nozzle. After the weighed liner is dispensed in the tube, another apparatus (not part of the present invention) is used to spread the liner in the tube.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 4 is a perspective view of a cartridge saddle.

FIG. 5 is a perspective view of a bearing block.

FIG. 6 is an end view of the V-block.

FIG. 7 is a perspective view of a mask.

DETAILED DESCRIPTION OF THE PREFERRED EMBODIMENTS

Figure 1:
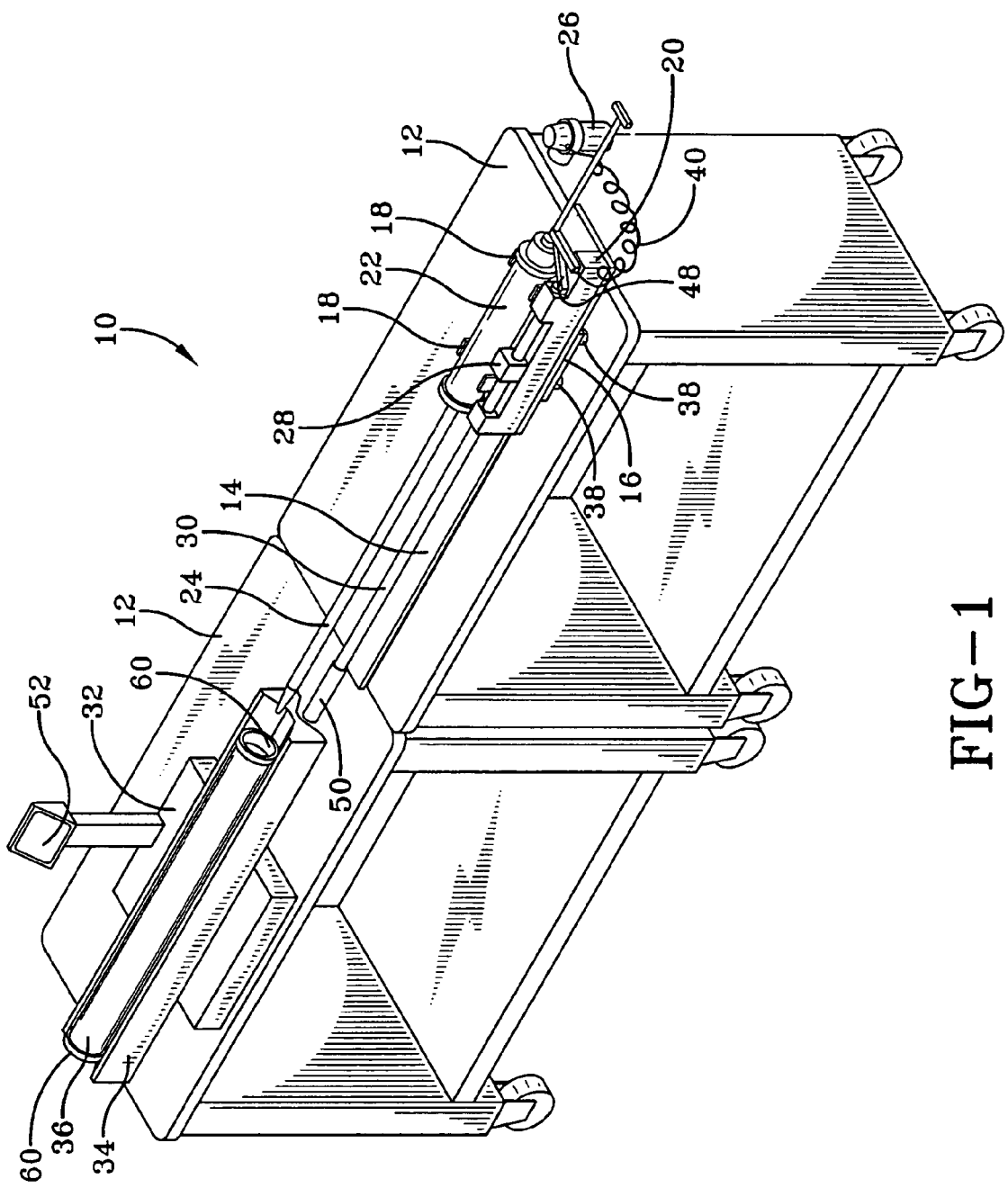
FIG. 1 is a front perspective view of an apparatus according to the invention.
Figure 2:
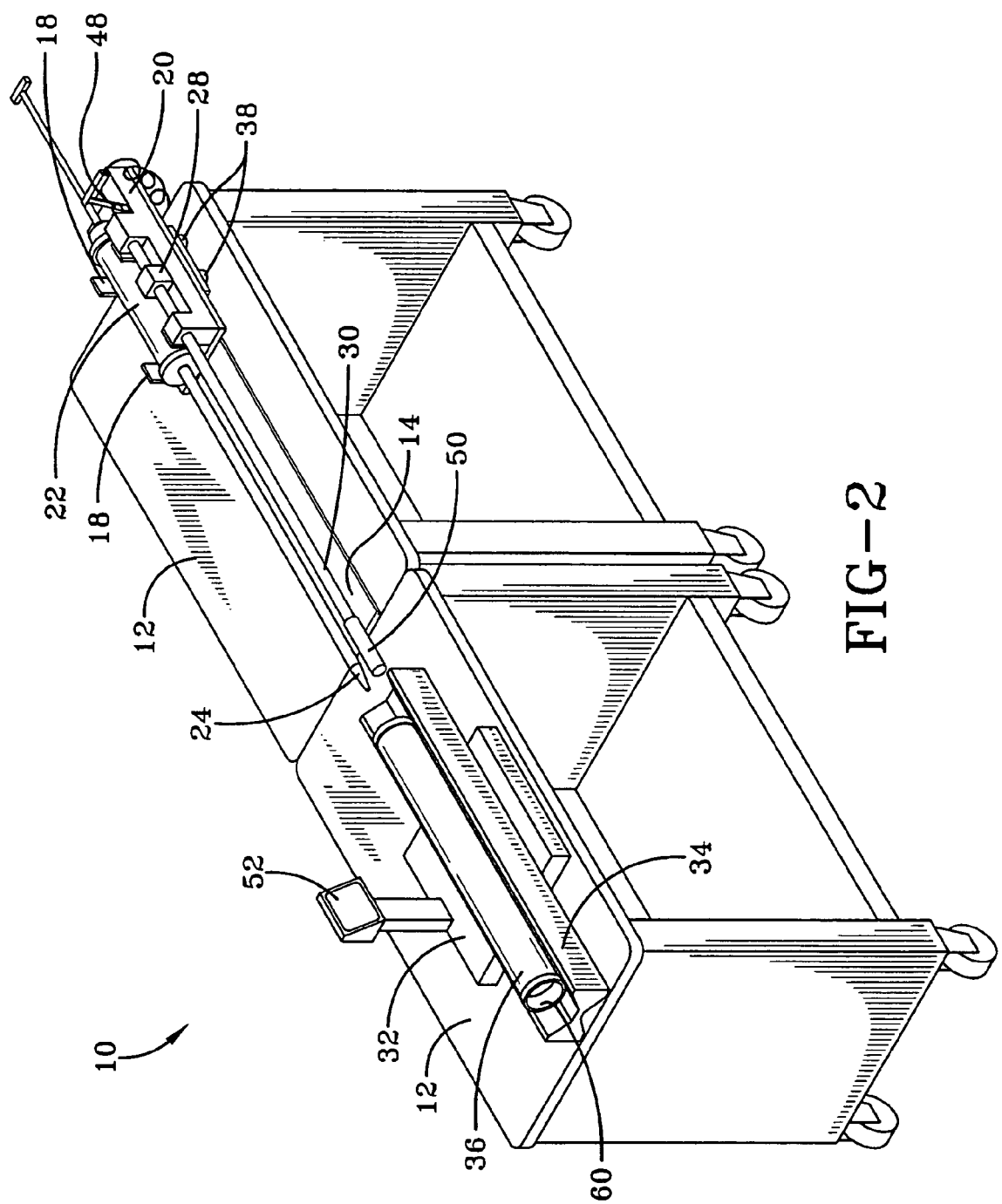
FIG. 2 is a top perspective view of the apparatus of FIG. 1.
Figure 3:
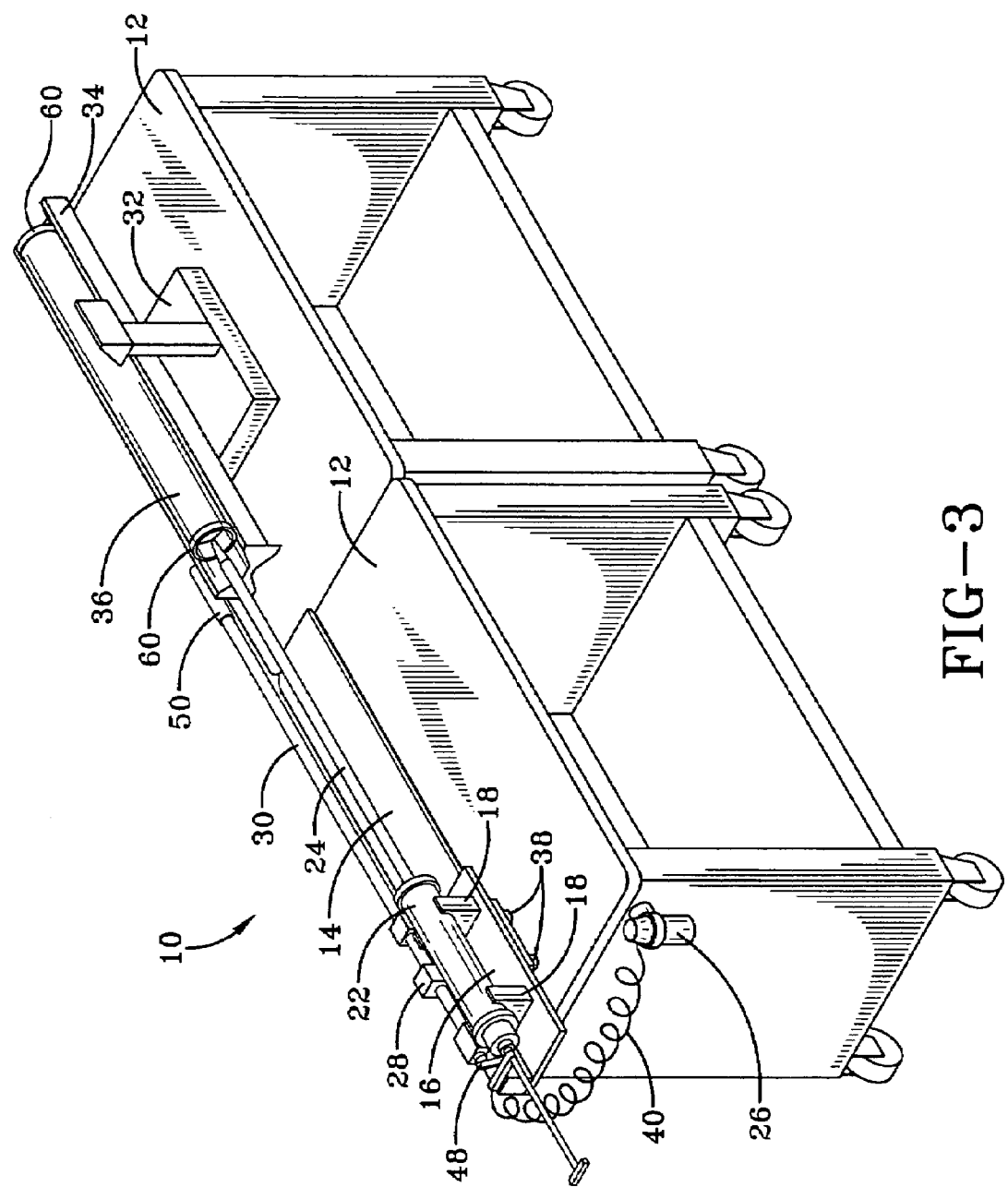
FIG. 3 is a rear perspective view of the apparatus of FIG. 1.

An apparatus 10 for applying liquid liner to the interior of a rocket motor tube 36 is shown in the perspective views of FIGS. 1–3. Apparatus 10 includes a horizontal surface 12, such as one or more tabletops. A rail 14 is mounted on the horizontal surface 12. A carriage 16 is movable along the rail 14. Carriage 16 has cartridge saddles 18 and a bearing block 20 mounted thereon. A cartridge gun 22 is disposed in the cartridge saddles 18. The cartridge gun 22 is filled with liquid liner material. The cartridge gun 22 has an extended tip 24 that is longer that the rocket motor tube 36 to be lined.

An air supply 26 is connected to the cartridge gun 22. Compressed air from air supply 26 provides the energy for forcing liquid liner out of gun 22. A rotary driven linear actuator 28 is mounted on the bearing block 20. A shaft drive 30 is mounted on the bearing block 20 in operative association with the rotary driven linear actuator 28 and in contact with the trigger 48 of the cartridge gun 22. A weighing scale 32 is disposed on the horizontal surface 12 and a V-block 34 is disposed on the weighing scale 32. The V-block 34 is for holding the rocket motor tube 36 with mounted end mask 60 in axial alignment with the tip 24 of the cartridge gun 22.

Rail 14 is attached to horizontal surface 12 by, for example, cap screws. The sides of rail 14 are grooved so that the wheels 38 of carriage 16 are engaged by the rail. In the embodiment shown, the carriage 16 has two wheels 38 on either side of the rail 14. The wheels 38 allow carriage 16 to move axially along rail 14. Rail 14 and carriage 16 are available from, for example, Helpco, Bryn Mawr, Pa.

Mounted on carriage 16 are cartridge saddles 18 and bearing block 20. FIG. 4 shows a perspective view of cartridge saddle 18. Cartridge saddles 18 are made from, for example, ultra-high molecular weight polyethylene. Cartridge saddles 18 support a cartridge gun 22. Cartridge gun 22 may be, for example, a 2.5 quart caulking gun connected to an air (or electrical power) supply. Cartridge gun 22 holds the liquid liner that is dispensed inside the rocket motor tube 36. Air hose 40 delivers compressed air from air supply 26 to gun 22. The air hose 40 is flexible and extendable. The tip 24 of cartridge gun 22 is longer than the length of the rocket motor tube 36 to be lined.

FIG. 5 is a perspective view of bearing block 20. Bearing block 20 is mounted on the carriage 16. Bearing block 20 is made from, for example, ultra-high molecular weight polyethylene. The rotary driven linear actuator 28 is mounted on bearing block 20 at location 42. Shaft drive 30 extends through opening 44 in the bearing block, into the rotary driven linear actuator 28, through opening 46 in the bearing block and abuts against the trigger 48 of the cartridge gun 22. Shaft drive 30 is manually rotated to adjust the rate of liner deposition in the rocket tube 36. As shaft drive 30 is rotated, the rotary driven linear actuator 28 transforms the rotation of shaft drive 30 into a linear displacement at the trigger 48 of the cartridge gun 22. One direction of rotation of the shaft drive 30 causes the trigger 48 to be further depressed, thereby increasing the flow rate of liner into rocket tube 36, while the opposite direction of rotation of the shaft drive 30 causes the trigger 48 to be partially released, thereby decreasing the flow rate of liner into rocket tube 36. Shaft drive 30 is made of, for example, stainless steel.

The end 50 of the shaft drive 30 is adjacent the tip 24 of the cartridge gun 22 and, as the carriage 16 moves along the rail 14, the tip 24 of the gun 22 and the end 50 of the shaft drive 30 maintain their relative positions adjacent each other. Thus, when the tip 24 enters tube 36 and is no longer visible, the end 50 of the shaft drive 30 indicates to the user the corresponding position of the tip 24 inside the tube 36. Weighing scale 32 includes a visual display 52 of weight. V-block 34 is disposed on scale 32 and rocket tube 36 is disposed in V-block 34.

To operate the apparatus, a rocket tube 36 is placed in V-block 34. The cartridge gun 22 is filled with liquid liner. Compressed air is fed to cartridge gun 22 from air supply 26 through hose 40. Tip 24 of gun 22 is aligned approximately in the center of the cross section of rocket tube 36. The user grasps shaft drive 30 and manually rotates it to depress trigger 48 of gun 22 to thereby begin depositing liner. To facilitate handling the shaft drive 30, the end 50 is a gripper material, such as on a bike handle bar.

As liner is deposited, the user also manually pulls shaft drive 30 axially to the left (as shown in FIGS. 1–3) to move tip 24 axially inside tube 36. The amount (weight) of liner being deposited is indicated on the scale 32. The user views the display 52 of the scale to determine if the correct amount of liner is being deposited. The user has two ways to adjust the amount of liner being deposited. First, the user can speed up or slow down the axial movement of the tip 24 within the tube 36 by simply pulling the shaft drive 30 faster or slower. Second, the user can rotate the shaft drive 30, which adjusts the position of trigger 48, to increase or decrease the amount of liner being deposited.

FIG. 6 is an end view of the V-block 34 which may be made from, for example, GAROLITE. V-block 34 has a generally V-shaped groove 56 in the top surface and another generally V-shaped groove 58 in the bottom surface. The grooves 56 and 58 are of different sizes. The rocket motor tubes 36 may have a variety of diameters. Therefore, it can be a problem to align the tip 24 with the approximate center of the cross section of different sized tubes 36. Moreover, each motor tube has different masking requirements. Some motor tubes may have different masking requirements at each end. This problem is solved by V-block 34 and masks.

FIG. 7 is a perspective view of an exemplary mask 60. Mask 60 includes a portion 62 which fits inside tube 36 and a flanged portion 64 that rests on V-block 34. An O-ring 70 is included on portion 62 to seal it against the inside of tube 36. Alternatively, it is possible that portion 62 may slip over the end of tube 36, in which case the O-ring is located on the interior of portion 62 to seal it against the exterior of tube 36. Each tube 36 will have masks at both ends. To overcome the centering problem, the outside diameter of the flanged portion 64 of one set of masks is the same for different outside diameter tubes. This set of masks, having an outside diameter 64a (FIG. 6) is used for the groove 56. In addition, another set of masks having a different outside diameter 64b (FIG. 6) of the flanged portion 64 is used in the other of the grooves 58 by merely flipping over the V-block 34.

In this manner, the time required to align the tip 24 within the center of the tube cross section is minimized because the dimension 65 in FIG. 6 is the same no matter which side of the V-block 34 is used. The V-block 34 may have two or more grooved surfaces such that the dimension 65 is the same for each associated set of grooves 56 or 58. Masks 60 are made of, for example, ultra high molecular weight polyethylene (UHMWPE). The use of UHMWPE for the bearing block, cartridge saddles and masks greatly reduces the effort needed to clean up any liner that is misplaced.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for applying liquid liner to the interior of a rocket motor tube, comprising:
   a horizontal surface;
   a rail mounted on the horizontal surface;
   a carriage that is movable along the rail;
   cartridge saddles and a bearing block mounted on the carriage;
   a cartridge gun disposed in the cartridge saddles, the cartridge gun including an extended tip that is longer than the rocket motor tube to be lined;
   a power supply connected to the cartridge gun;
   a rotary driven linear actuator mounted on the bearing block;
   a shaft drive mounted on the bearing block in operative association with the rotary driven linear actuator and in contact with a trigger of the cartridge gun;
   a weighing scale disposed on the horizontal surface; and
   a V-block disposed on the weighing scale, the V-block for holding the rocket motor tube in axial alignment with the extended tip of the cartridge gun.

2. The apparatus of claim 1 wherein the cartridge gun is filled with liquid liner.

3. The apparatus of claim 1 wherein the carriage includes wheels that engage sides of the rail.

4. The apparatus of claim 1 wherein an end of the shaft drive and an end of the extended tip of the cartridge gun are at substantially the same axial position.

5. The apparatus of claim 1 wherein the V-block includes a generally V-shaped groove of a first size on a top surface and a generally V-shaped groove of a second size on a bottom surface.

6. The apparatus of claim 1 further comprising masks placed in both ends of the rocket motor tube wherein the masks contact the V-block and the rocket motor tube does not contact the V-block.

7. The apparatus of claim 1 wherein the power supply is an air supply.

8. The apparatus of claim 6 wherein the masks comprise ultra high molecular weight polyethylene.

9. The apparatus of claim 6 wherein the masks include an O-ring.

* * * * *